US012512247B2

(12) United States Patent
Sasaki et al.

(10) Patent No.: US 12,512,247 B2
(45) Date of Patent: Dec. 30, 2025

(54) INDUCTOR COMPONENT

(71) Applicant: Murata Manufacturing Co., Ltd., Kyoto-fu (JP)

(72) Inventors: Katsufumi Sasaki, Nagaokakyo (JP); Yoshimasa Yoshioka, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 732 days.

(21) Appl. No.: 17/818,569

(22) Filed: Aug. 9, 2022

(65) Prior Publication Data

US 2023/0058751 A1 Feb. 23, 2023

(30) Foreign Application Priority Data

Aug. 19, 2021 (JP) ................................ 2021-134150

(51) Int. Cl.
*H01F 27/24* (2006.01)
*H01F 27/02* (2006.01)
*H01F 27/22* (2006.01)

(52) U.S. Cl.
CPC ........... *H01F 27/22* (2013.01); *H01F 27/025* (2013.01)

(58) Field of Classification Search
CPC ........... H01F 17/0013; H01F 2017/048; H01F 17/04; H01F 27/255
See application file for complete search history.

(56) References Cited

U.S. PATENT DOCUMENTS

| | | | | |
|---|---|---|---|---|
| 7,251,120 | B2 * | 7/2007 | Takazawa | H01G 4/40 361/321.1 |
| 10,875,095 | B2 * | 12/2020 | Inoue | H01F 17/0013 |
| 2003/0214793 | A1 * | 11/2003 | Uchida | H01F 17/0013 361/761 |
| 2016/0012961 | A1 * | 1/2016 | Suzuki | H01F 27/29 29/602.1 |
| 2016/0276089 | A1 * | 9/2016 | Inoue | H01F 17/0033 |
| 2017/0162317 | A1 * | 6/2017 | Taniguchi | H01F 27/255 |
| 2017/0200554 | A1 * | 7/2017 | Kudo | H01F 27/36 |
| 2018/0286568 | A1 * | 10/2018 | Suzuki | H01F 41/122 |
| 2019/0326041 | A1 * | 10/2019 | Kawaguchi | H01F 1/06 |
| 2020/0098506 | A1 * | 3/2020 | Hamada | H01F 27/32 |
| 2020/0373054 | A1 * | 11/2020 | Hirukawa | H01F 17/0013 |

FOREIGN PATENT DOCUMENTS

JP 6024243 B2 11/2016

* cited by examiner

*Primary Examiner* — Mang Tin Bik Lian
(74) *Attorney, Agent, or Firm* — Studebaker Brackett PLLC

(57) ABSTRACT

An inductor component includes an element body; and a coil in the element body. The element body includes a metal magnetic powder-containing resin having a resin and metal magnetic powder in the resin. The element body has a rectangular parallelepiped shape having first and second principal surfaces facing each other, and first, second, third and fourth side surfaces connected to the first and second principal surfaces. Each of the first and second principal surfaces has an area larger than an area of each of the first to fourth side surfaces. Each of the first side surface and the first principal surface has one or more recesses, and a deepest recess among the one or more recesses on the first side surface has a maximum depth that is larger than a maximum depth of a deepest recess among the one or more recesses on the first principal surface.

20 Claims, 7 Drawing Sheets

INDUCTOR COMPONENT

CROSS-REFERENCE TO RELATED APPLICATION

This application claims benefit of priority to Japanese Patent Application No. 2021-134150, filed Aug. 19, 2021, the entire content of which is incorporated herein by reference.

BACKGROUND

Technical Field

The present disclosure relates to an inductor component.

Background Art

Conventionally, as an inductor component, there is an inductor component described in Japanese Patent Application Laid-Open No. 6024243. This inductor component includes an element body and a coil provided in the element body, and the element body includes a metal magnetic powder-containing resin having a resin and metal magnetic powder contained in the resin.

SUMMARY

In the conventional inductor component, heat self-generated heat, generated by a resistance loss, an eddy current loss, and the like inside the component, is released to the outside from a principal surface and a side surface of the component and an exposed conductor to be bonded at the time of mounting the component. However, in the self-generated heat, the amount of heat released from the principal surface and the side surface of the component is limited by a surface area of the element body, and there is room for improving heat dissipation in the conventional inductor component.

Therefore, the present disclosure provides an inductor component capable of improving heat dissipation.

An inductor component according to an aspect of the present disclosure includes an element body; and a coil provided in the element body. The element body includes a metal magnetic powder-containing resin having a resin and metal magnetic powder contained in the resin. The element body has a rectangular parallelepiped shape that has a first principal surface and a second principal surface facing each other, and a first side surface, a second side surface, a third side surface, and a fourth side surface connected to the first principal surface and the second principal surface. Each of the first principal surface and the second principal surface has an area larger than an area of each of the first to fourth side surfaces. Each of the first side surface and the first principal surface is provided with one or a plurality of recesses, and a deepest recess among the one or plurality of recesses on the first side surface has a maximum depth that is larger than a maximum depth of a deepest recess among the one or plurality of recesses on the first principal surface.

Here, in a case where there is only one recess on the first side surface, "the maximum depth of the deepest recess among the one or plurality of recesses on the first side surface" means a maximum value of a depth of the recess in a direction orthogonal to a line segment connecting two open ends of the one recess of the first side surface in a section on a plane that includes a center of the element body and is orthogonal to the first principal surface and the first side surface. In a case where there are a plurality of recesses on the first side surface, "the maximum depth of the deepest recess among the one or plurality of recesses on the first side surface" means a largest value on the first side surface among maximum values of depths of the respective recesses in a direction orthogonal to a line segment connecting two open ends of the one recess of the first side surface in a section on a plane that includes a center of the element body and is orthogonal to the first principal surface and the first side surface. In the following description, the "maximum depth of the deepest recess among the one or plurality of recesses on the first side surface" may be simply referred to as the "maximum depth of the recess on the first side surface".

Similarly, in a case where there is only one recess on the first principal surface, "the maximum depth of the deepest recess among the one or plurality of recesses on the first principal surface" means a maximum value of a depth of the recess in a direction orthogonal to a line segment connecting two open ends of the one recess of the first principal surface in a section on a plane that includes a center of the element body and is orthogonal to the first principal surface and the first side surface. In a case where there are a plurality of recesses on the first principal surface, "the maximum depth of the deepest recess among the one or plurality of recesses on the first principal surface" means a largest value on the first principal surface among maximum values of depths of the respective recesses in a direction orthogonal to a line segment connecting two open ends of the one recess of the first principal surface in a section on a plane that includes a center of the element body and is orthogonal to the first principal surface and the first side surface. In the following description, the "maximum depth of the deepest recess among the one or plurality of recesses on the first principal surface" may be simply referred to as the "maximum depth of the recess on the first principal surface".

According to the inductor component of the present disclosure, the recess is provided on the first side surface and the second principal surface. Therefore, a surface area of the element body increases, and heat dissipation of the inductor component can be improved.

In addition, the maximum depth of the recess on the first side surface is larger than the maximum depth of the recess on the first principal surface in the thin component according to the inductor component of the present disclosure. Therefore, it is possible to increase the surface area of the element body on a side of the side surface while suppressing a decrease in strength of the element body caused by the recess. As a result, the heat dissipation of the inductor component can be improved without reducing the strength of the element body.

In addition, since the maximum depth of the recess on the first side surface is larger than the maximum depth of the recess on the first principal surface according to the inductor component of the present disclosure, the heat dissipation of the inductor component can be improved without reducing the visibility at the time of image recognition in a case where a direction recognition mark or the like is provided on the first principal surface.

In addition, in an embodiment of the inductor component, the first side surface faces the third side surface, the second side surface faces the fourth side surface, and a distance between the first principal surface and the second principal surface is shorter than a distance between the first side surface and the third side surface and a distance between the second side surface and the fourth side surface.

According to the above embodiment, the inductor component can be further thinned.

In addition, in an embodiment of the inductor component, the second principal surface is provided with one or a plurality of recesses, and the maximum depth of the deepest recess among the one or plurality of recesses on the first side surface is larger than a maximum depth of a deepest recess among the one or plurality of recesses on the second principal surface.

According to the above embodiment, since the maximum depth of the recess on the first side surface is larger than the maximum depth of the recess on the second principal surface, the heat dissipation can be improved more effectively without reducing the strength of the element body.

In addition, in an embodiment of the inductor component, each of the second to fourth side surfaces is provided with one or a plurality of recesses, and a maximum depth of a deepest recess among the one or plurality of recesses on each of the second to fourth side surfaces is larger than the maximum depth of the deepest recess among the one or plurality of recesses on the first principal surface.

According to the above embodiment, a surface area of the side surface of the element body further increases, and the heat dissipation of the side surface of the element body can be further improved. In addition, the recesses are provided on all the side surfaces of the first to fourth side surfaces, and thus, the distribution of heat generation of the element body discharged from the side surface of the component can be controlled by controlling the maximum depth of the recess for each of the side surfaces of the element body.

In addition, in an embodiment of the inductor component, the distance between the first principal surface and the second principal surface is 300 μm or less.

According to the above embodiment, the heat dissipation can be improved in the thin component in which the distance between the first principal surface and the second principal surface is 300 μm or less.

In addition, in an embodiment of the inductor component, the metal magnetic powder-containing resin is exposed on the first side surface, and all of the recesses on the first side surface are provided on an exposed surface of the metal magnetic powder-containing resin.

The metal magnetic powder-containing resin contains the metal magnetic powder, and thus, has a high thermal conductivity. According to the above embodiment, the heat dissipation of the inductor component can be more effectively improved since all of the recesses on the first side surface are provided on the exposed surface of the metal magnetic powder-containing resin.

In addition, in an embodiment of the inductor component, an inner surface of at least one of the one or plurality of recesses on the first side surface has a hemispherical shape.

According to the above embodiment, since the inner surface of the at least one recess has the hemispherical shape, the mechanical stress is dispersed on the inner surface of the recess, and the strength of the element body can be secured.

In addition, in an embodiment of the inductor component, the inner surface of at least one of the one or plurality of recesses on the first side surface is made of the resin in the metal magnetic powder-containing resin.

The mechanical stress is more easily concentrated on the inner surface of the recess as compared with a portion other than the inner surface of the recess, and a defect such as a crack relatively easily occurs. According to the above embodiment, the inner surface of the recess on the first side surface is made of the resin in the metal magnetic powder-containing resin. Therefore, when the mechanical stress is concentrated on the inner surface of the recess, it is possible to suppress the occurrence of the defect such as the crack and to suppress deterioration in characteristics and reliability of the inductor component.

In addition, in an embodiment of the inductor component, the metal magnetic powder contains iron, and a cut particle of the metal magnetic powder is exposed on at least one of the first to fourth side surfaces.

According to the above embodiment, the heat dissipation of the side surface of the element body can be further improved since the cut particle of the metal magnetic powder is exposed on at least one of the first to fourth side surfaces.

In addition, in an embodiment of the inductor component, when a maximum diameter of an exposed surface of the cut particle of the metal magnetic powder is D (μm) and the distance between the first principal surface and the second principal surface is T (μm), $D \geq 0.3\ T$ is satisfied.

Here, the "maximum diameter of the exposed surface of the cut particle of the metal magnetic powder" means a maximum value among circle-equivalent diameters of exposed surfaces of a plurality of cut particles of the metal magnetic powder obtained from the particles of the metal magnetic powder exposed to at least one side surface among the first to fourth side surfaces.

According to the above embodiment, the heat dissipation of the side surface of the element body can be further improved since the maximum diameter of the exposed surface of the metal magnetic powder can be set to be relatively large.

In addition, in an embodiment of the inductor component, $D \geq 10$ is further satisfied.

According to the above embodiment, the heat dissipation of the side surface of the element body can be more effectively improved.

In addition, in an embodiment of the inductor component, an oxide film is formed on the exposed surface of the cut particle of the metal magnetic powder.

Since the metal magnetic powder has electrical conductivity, when the cut particle of the metal magnetic powder comes into contact with an external terminal of an adjacent component, current leakage may occur through the metal magnetic powder. According to the above embodiment, the oxide film is formed on the exposed surface of the cut particle of the metal magnetic powder. Since the oxide film increases an electrical resistance of the metal magnetic powder, a short-circuit resistance of the inductor component can be improved.

According to the inductor component according to one aspect of the present disclosure, it is possible to achieve the inductor component capable of improving the heat dissipation.

DETAILED DESCRIPTION

Figure 1:
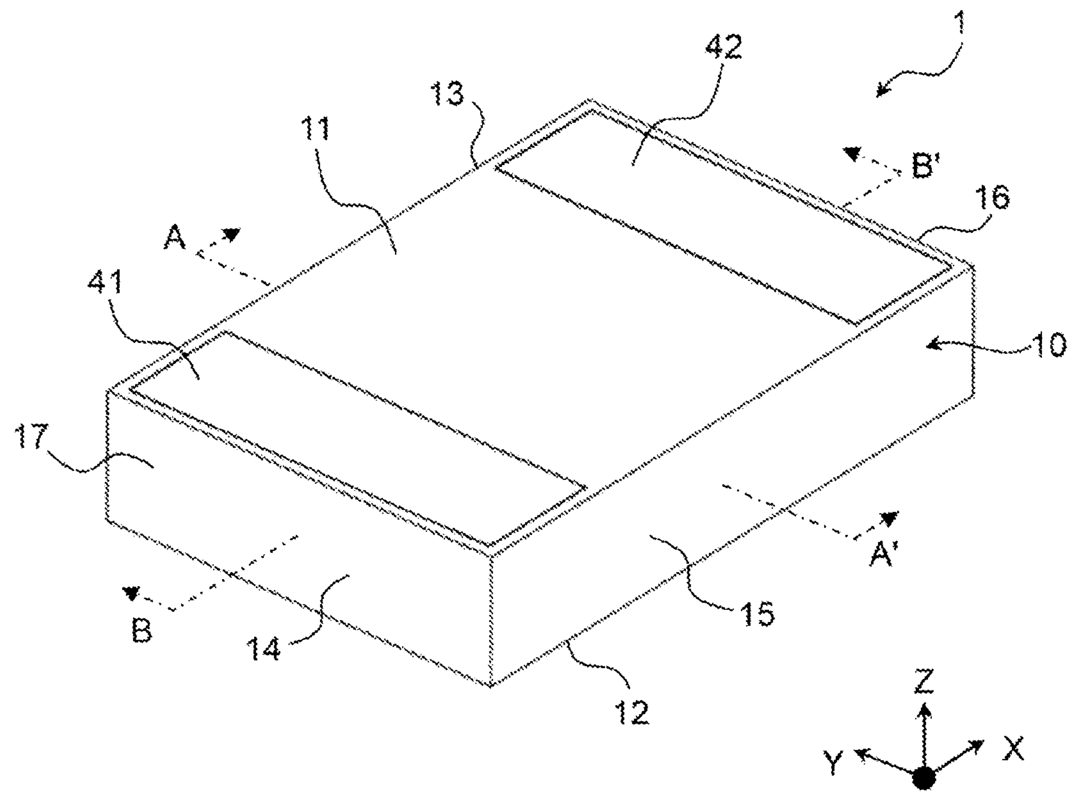
FIG. 1 is a perspective view illustrating an inductor component according to a first embodiment.

Hereinafter, an inductor component which is one aspect of the present disclosure will be described in detail with reference to embodiments illustrated in the drawings. Note that the drawings include some schematic views, and do not reflect actual dimensions and ratios in some cases.

First Embodiment (Overall Configuration)

Figure 2:
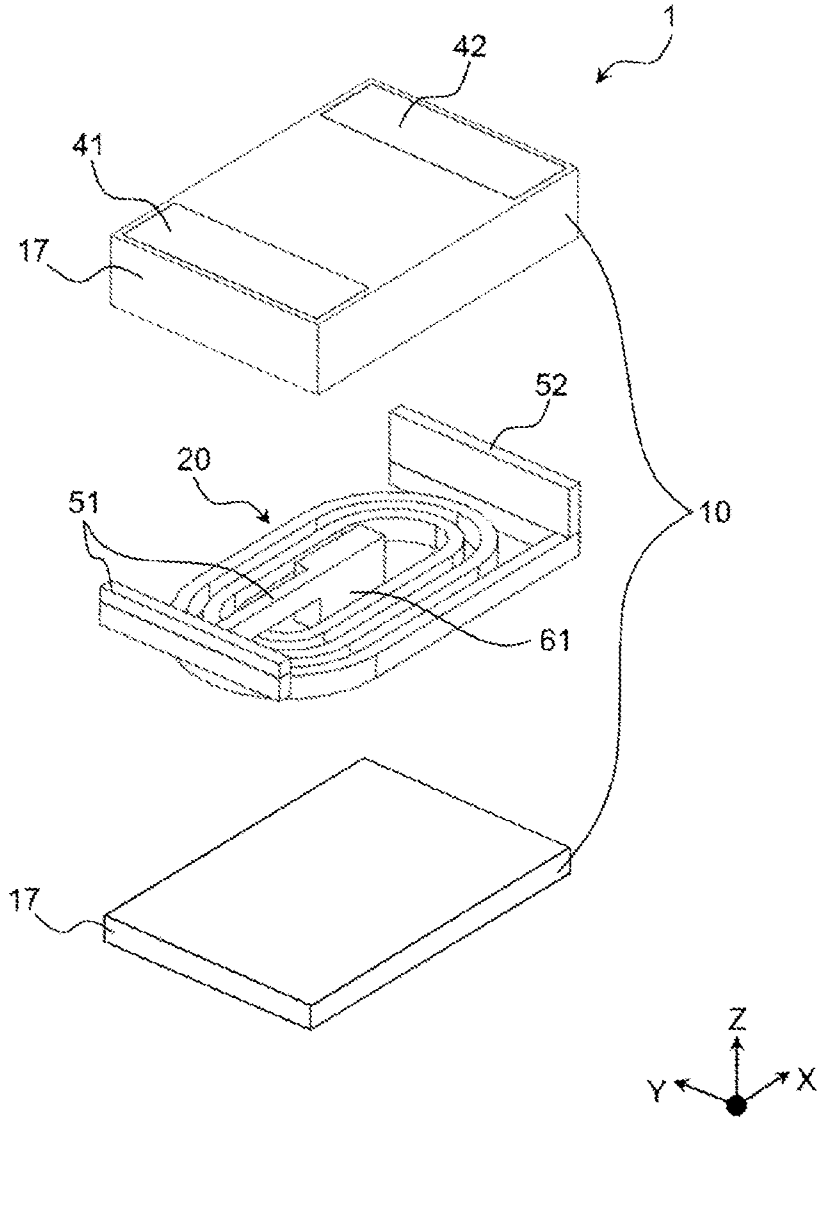
FIG. 2 is an exploded perspective view illustrating the inductor component according to the first embodiment.
Figure 3A:
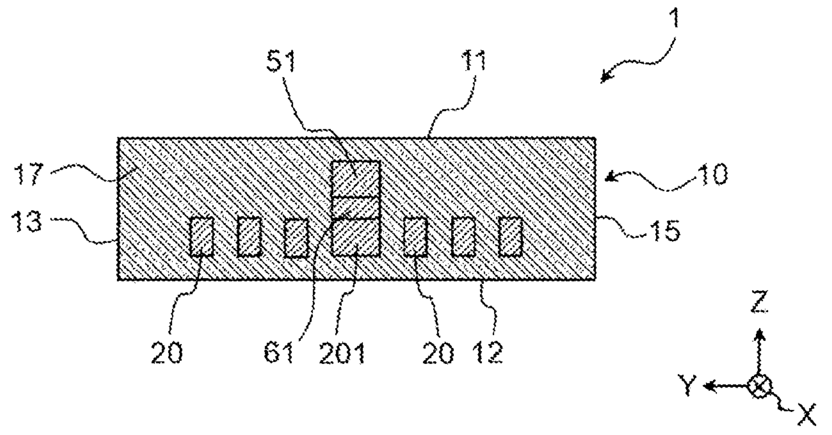
FIG. 3A is a sectional view taken along line A-A' of FIG. 1.
Figure 3B:
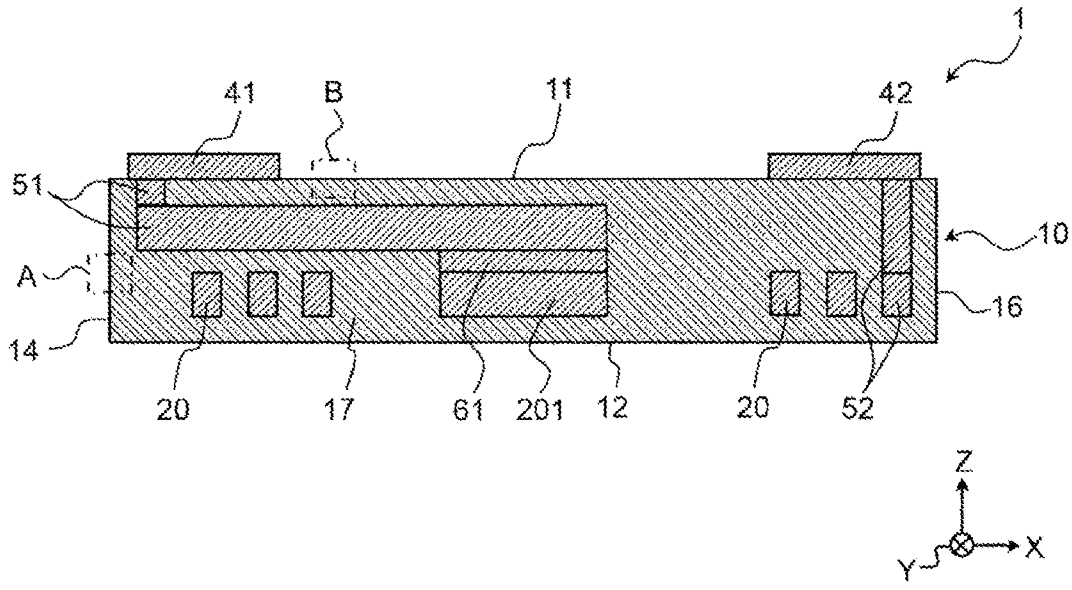
FIG. 3B is a sectional view taken along line B-B' of FIG. 1.

FIG. 1 is a perspective view illustrating a first embodiment of an inductor component. FIG. 2 is an exploded perspective view of the inductor component. FIG. 3A is a sectional view taken along line A-A' of FIG. 1. FIG. 3B is a sectional view taken along line B-B' of FIG. 1. Specifically, FIG. 3A is a section that includes a center of an element body and is parallel to a second side surface and a fourth side surface of the element body. FIG. 3B is a section that includes the center of the element body and is parallel to a first side surface and a third side surface of the element body.

An inductor component 1 is mounted on an electronic device such as a personal computer, a DVD player, a digital camera, a TV, a mobile phone, a smartphone, or car electronics, and is, for example, a component having a rectangular parallelepiped shape as a whole.

As illustrated in FIGS. 1 to 3B, the inductor component 1 includes: an element body 10; a coil 20 provided in the element body 10; a first extended wiring 51 electrically connected to a first end of the coil 20; a second extended wiring 52 electrically connected to a second end of the coil 20; a first external terminal 41 provided on a surface of the element body 10 and electrically connected to the first extended wiring 51; and a second external terminal 42 electrically connected to the second extended wiring 52.

The element body 10 is a member that holds the coil 20, the first extended wiring 51, and the second extended wiring 52. A shape of the element body 10 is a rectangular parallelepiped having a first principal surface 11 and a second principal surface 12 facing each other, and first to fourth side surfaces 13 to 16 connected to the first principal surface 11 and the second principal surface 12. The first side surface 13 faces the third side surface 15, and the second side surface 14 faces the fourth side surface 16. As illustrated in the drawing, a direction orthogonal to the first principal surface 11 and the second principal surface 12 is defined as a Z direction (vertical direction), and hereinafter, a forward Z direction is defined as an upper side, and a reverse Z direction is defined as a lower side. A direction orthogonal to the Z direction and orthogonal to the second side surface 14 and the fourth side surface 16 is defined as an X direction. A direction orthogonal to the Z direction and orthogonal to the first side surface 13 and the third side surface 15 is defined as a Y direction. Hereinafter, the X direction is also referred to as a "length direction", the Y direction is also referred to as a "width direction", and the Z direction is also referred to as a "thickness direction". In n, the term "rectangular parallelepiped" encompasses not only a case where six surfaces are orthogonal to each other but also a case where the surfaces intersect each other at an angle slightly deviating from the right angle.

An area of each of the first principal surface 11 and the second principal surface 12 is larger than an area of each of the first to fourth side surfaces 13 to 16. That is, the inductor component 1 is a thin component having a small thickness in the Z direction. Preferably, a distance between the first principal surface 11 and the second principal surface 12 is 300 μm or less. Preferably, the distance between the first principal surface 11 and the second principal surface 12 is twice or more a diameter of a particle of metal magnetic powder. For example, the distance between first principal surface 11 and second principal surface 12 is 50 μm or more. Preferably, the distance between the first principal surface 11 and the second principal surface 12 is shorter than a distance between the first side surface 13 and the third side surface 15 and a distance between the second side surface 14 and the fourth side surface 16.

The element body 10 includes a metal magnetic powder-containing resin 17 having a resin and metal magnetic powder contained in the resin. In the present embodiment, the element body 10 is made of only the metal magnetic powder-containing resin 17. Examples of the resin include an epoxy resin, a phenol resin, a polyimide resin, an acrylic resin, a phenol resin, a vinyl ether resin, and a mixture thereof. Examples of the metal magnetic powder include powder of a metal magnetic material such as an FeSi alloy such as FeSiCr, an FeCo alloy, an Fe alloy such as NiFe, or amorphous alloys thereof, and powder of ferrite such as NiZn and MnZn, and the like. A content of the metal magnetic powder is preferably 50% by volume or more and 85% by volume or less (i.e., from 50% by volume to 85% by volume) relative to the entire resin. Note that the metal magnetic powder preferably has a substantially spherical particle, and an average particle size thereof is preferably 5 μm or less.

The coil 20 is a wiring extending in a spiral shape along the first principal surface 11 and the second principal surface 12 of the element body 10. The coil 20 preferably has the spiral shape in which the number of turns exceeds 1 turn. In the present embodiment, the number of turns of the coil 20 is about 2.5 turns. For example, when viewed from above, the coil 20 is spirally wound in a clockwise direction from an outer peripheral end (second end) toward an inner peripheral end (first end). The coil 20 is made of a conductive material, for example, a metal material having a low electrical resistance such as Cu, Ag, or Au.

The first extended wiring 51 is preferably a wiring that is made of the same conductive material as the coil 20 and electrically connects the coil 20 and the first external terminal 41. A shape of the first extended wiring 51 is not particularly limited. In the present embodiment, the first extended wiring 51 has a portion extending in the X direction and a portion extending in the Y direction. A shape of the first extended wiring 51 is a T-shape as viewed from above. The first extended wiring 51 is electrically connected to the inner peripheral end of the coil 20 through a via wiring 61 and a via pad 201. The via wiring 61 is a wiring that connects the first extended wiring 51 and the coil 20. The via pad 201 is an end portion of the coil 20 connected to the via wiring 61. A first end of the first extended wiring 51 is connected to an upper end portion of the via wiring 61. A lower end portion of the via wiring 61 is connected to the via pad 201. A second end of the first extended wiring 51 is exposed to the first principal surface 11 of the element body 10 and connected to the first external terminal 41. With the above configuration, the coil 20 and the first external terminal 41 are electrically connected.

The second extended wiring 52 is preferably a wiring that is made of the same conductive material as the coil 20, and electrically connects the coil 20 and the second external terminal 42. A shape of the second extended wiring 52 is not particularly limited. In the present embodiment, the second extended wiring 52 is the wiring extending in the Y direction. A first end of the second extended wiring 52 is connected to the outer peripheral end of the coil 20. A second end of the second extended wiring 52 is exposed to the first principal surface 11 of the element body 10 and connected to the second external terminal 42. With the above configuration, the coil 20 and the second external terminal 42 are electrically connected.

The first external terminal 41 and the second external terminal 42 are made of a conductive material, and each have a three-layer configuration in which, for example, Cu having low electrical resistance and excellent stress resistance, Ni having excellent corrosion resistance, and Au having excellent solder wettability and reliability are arranged in this order from the inside to the outside.

The first external terminal 41 is provided on the first principal surface 11 of the element body 10 and covers an upper surface of the first extended wiring 51. Thus, the first external terminal 41 is electrically connected to the inner peripheral end of the coil 20. The second external terminal 42 is provided on the first principal surface 11 of the element body 10 and covers an upper surface of the second extended wiring 52 exposed from the first principal surface 11. Thus, the second external terminal 42 is electrically connected to the outer peripheral end of the coil 20.

The first external terminal 41 and the second external terminal 42 are preferably subjected to a rust prevention treatment. Here, the rust prevention treatment means coating with Ni and Au, Ni and Sn, or the like. Thus, copper leaching and rust due to solder can be suppressed, and the inductor component 1 with high mounting reliability can be provided.

(Detailed Configuration of Element Body)

Next, a detailed configuration of the element body 10 will be described.

In the element body 10, one or a plurality of recesses are provided on at least one side surface among the first to fourth side surfaces 13 to 16 and at least one principal surface between the first principal surface 11 and the second principal surface 12. Further, a maximum depth of a deepest recess among the one or plurality of recesses on at least one of the first to fourth side surfaces 13 to 16 is larger than a maximum depth of a deepest recess among the one or plurality of recesses on at least one of the first principal surface 11 and the second principal surface 12. In the present embodiment, the one or plurality of recesses are provided on the second side surface 14, and the one or plurality of recesses are provided on the first principal surface 11. Therefore, one corresponding to the "first side surface" and one corresponding to the "first principal surface" in the claims are the second side surface 14 and the first principal surface 11, respectively, in the present embodiment.

Figure 4A:
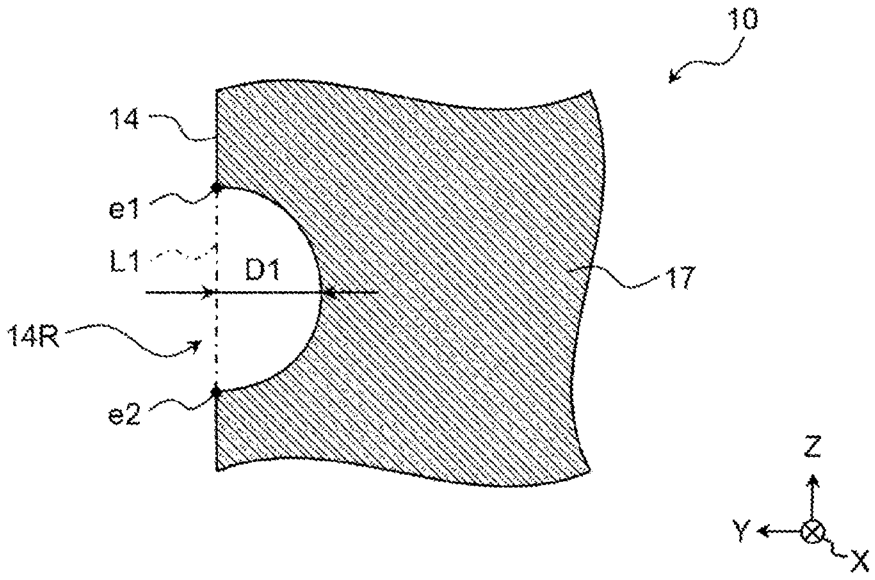
FIG. 4A is an enlarged view of a region A in FIG. 3B.
Figure 4B:
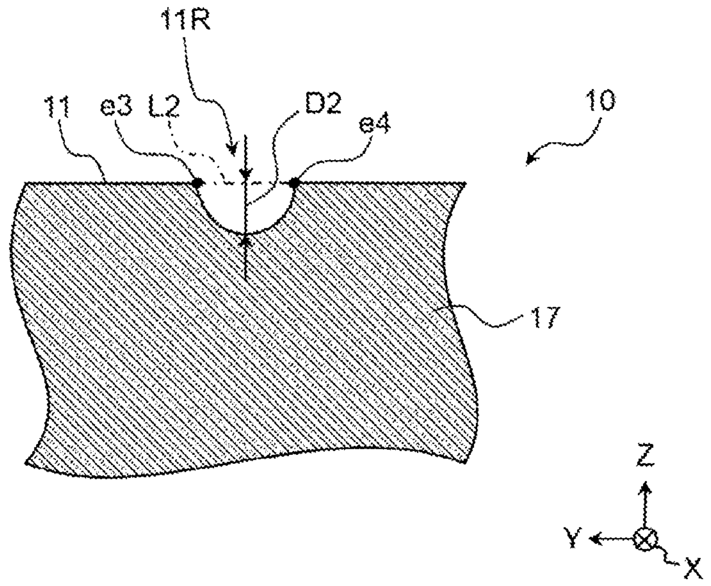
FIG. 4B is an enlarged view of a region B in FIG. 3B.

FIG. 4A is an enlarged view of a region A (the second side surface 14) in FIG. 3B. FIG. 4B is an enlarged view of a region B (the first principal surface 11) in FIG. 3B. As illustrated in FIG. 4A, a recess 14R is provided on the second side surface 14 of the element body 10. A shape of an inner surface of the recess 14R is not particularly limited, but is preferably hemispherical. When the shape of the inner surface of the recess 14R is hemispherical, mechanical stress is dispersed on the inner surface of the recess 14R, and the strength of the element body 10 can be secured. Although a plurality of the recesses 14R are provided on the second side surface 14, only one recess may be provided. It is preferable that the number of the recesses 14R be large since heat dissipation can be improved. In addition, it is preferable that the recesses 14R be uniformly distributed because a heat dissipation effect on the second side surface 14 can be obtained in a wide range. Although the one or plurality of recesses 14R are provided on the second side surface 14 in the present embodiment, the recess may be provided on any of the first side surface 13, the third side surface 15, and the fourth side surface 16. In addition, one or a plurality of recesses may be provided on each of a plurality of side surfaces of the first to fourth side surfaces 13 to 16, or one or a plurality of recesses may be provided on each of all the side surfaces of the first to fourth side surfaces 13 to 16. That is, any one of the first side surface 13, the third side surface 15, and the fourth side surface 16 may correspond to the "first side surface" in the claims.

In addition, a recess 11R is provided on the first principal surface 11 of the element body 10 as illustrated in FIG. 4B. A shape of the recess 11R is not particularly limited, but is preferably hemispherical. Although a plurality of the recesses 11R are provided on the first principal surface 11, only one recess may be provided. In the present embodiment, the recess 11R is provided on the first principal surface 11, but the recess may be provided on the second principal surface 12, or one or a plurality of recesses may be provided on each of the first principal surface 11 and the second principal surface 12. That is, the second principal surface 12 may correspond to the "first principal surface" in the claims.

The maximum depth of the deepest recess among the recesses 14R is larger than a maximum depth of a deepest recess among the recesses 11R. Here, the "maximum depth of the deepest recess among the recesses 14R" will be described. First, in a case where there are the plurality of recesses 14R in a section in a plane that includes the center of the element body 10 and is orthogonal to the first principal surface 11 and the second side surface 14, each value of D1 is obtained. The value of D1 is a maximum value of the depth of the recess 14R in a direction orthogonal to a line segment L1 connecting a first open end e1 and a second open end e2 of the recess 14R. Subsequently, the values of D1 of all of the recesses 14R of the second side surface 14 obtained in the section are compared to obtain the largest value thereof. The largest value is the "maximum depth of the deepest recess among the recesses 14R". Note that, in a case where there is one recess 14R on the second side surface 14 in the section, D1 of the recess 14R is the "maximum depth of the deepest recess among the recesses 14R".

Similarly, in a case where there are the plurality of recesses 11R in a section in the plane that includes the center of the element body 10 and is orthogonal to the first principal surface 11 and the second side surface 14, each value of D2 is obtained as the "maximum depth of deepest recess among the recesses 11R". The value of D2 is a maximum value of the depth of the recess 11R in a direction orthogonal to a line segment L2 connecting a first open end e3 and a second open end e4 of the recess 11R. Subsequently, the values of D2 of all of the recesses 11R of the first principal surface 11 obtained in the section are compared to obtain the largest value thereof. The largest value is the "maximum depth of the deepest recess among the recesses 11R". Note that, in a case where there is one recess 11R on the first principal surface 11 in the section, D1 of the recess 11R is the "maximum depth of the deepest recess among the recesses 11R". A maximum depth of a recess on each of the second principal surface 12, the first side surface 13, the third side surface 15, and the fourth side surface 16 is similarly defined.

In the case where there are the plurality of recesses 14R, maximum values of the depths in all of the recesses 14R of the second side surface 14 are not necessarily larger than maximum values of the depths in all of the recesses 11R of the first principal surface 11. That is, the plurality of recesses 14R of the second side surface 14 may include the recess 14R having the maximum value of the depth that is smaller than the maximum value of the depth in the recess 11R of the first principal surface 11.

In addition, the "recess" in the present disclosure includes a recess that can be generated by grinding the surface of the element body 10 to be flat. For example, a maximum value of a depth in a direction orthogonal to a line segment connecting a first open end and a second open end of the recess is 0.5 μm or more.

Figure 5:
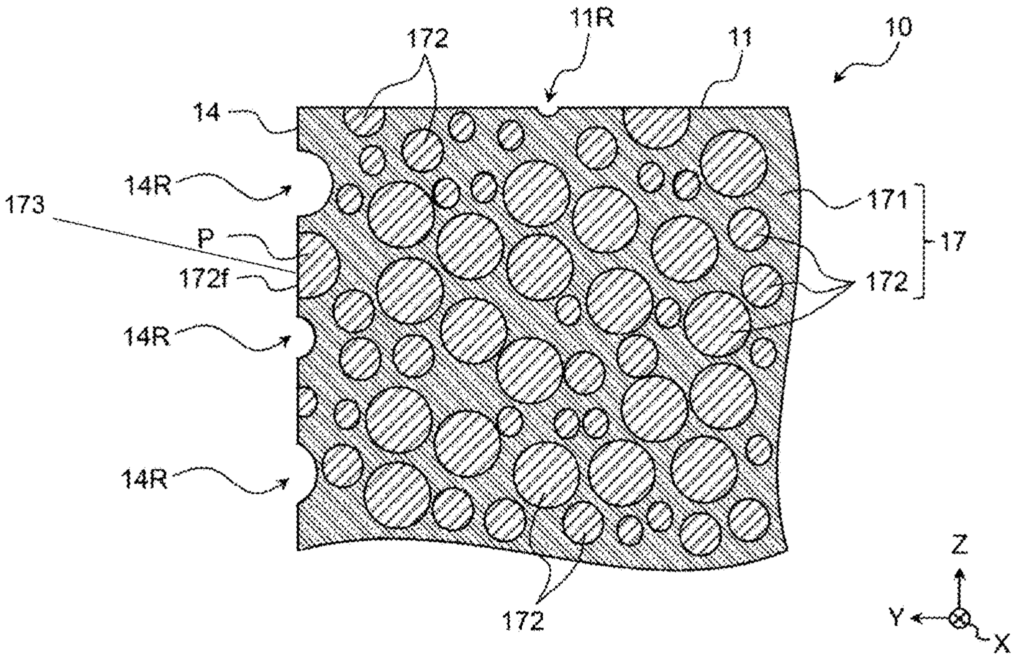
FIG. 5 is a schematic sectional view schematically illustrating a configuration of a region including a principal surface and a side surface of an element body.
Figure 6:
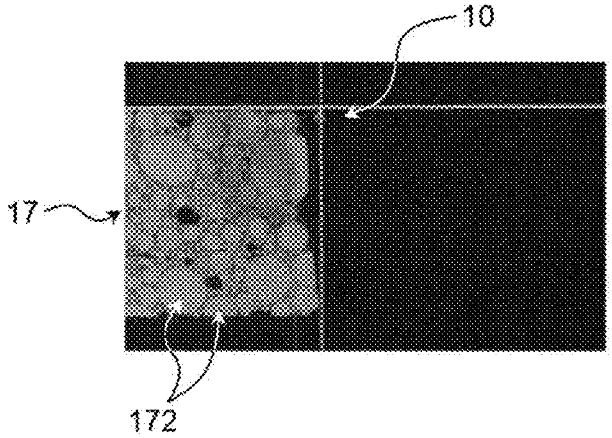
FIG. 6 is an image view illustrating a shape of the side surface of the element body.

FIG. 5 is a schematic sectional view schematically illustrating a configuration of a region including the first principal surface 11 and the second side surface 14 of the element body. FIG. 6 is an image view illustrating a shape of the side surface of the element body. Specifically, an optical micrograph is used. As illustrated in FIGS. 5 and 6, the element body 10 is made of the metal magnetic powder-containing resin 17 in the present embodiment. The metal magnetic powder-containing resin 17 includes a resin 171 and metal magnetic powder 172 contained in the resin 171. The recesses 14R are provided on the second side surface 14 of the element body 10. The recesses 11R are provided on the first principal surface 11 of the element body 10.

Here, the first principal surface 11 and the second principal surface 12 are subjected to a surface grinding treatment in a grinding process. Alternatively, the first principal surface 11 and the second principal surface 12 are covered with a resin or the like after the grinding process. Therefore, the first principal surface 11 and the second principal surface 12 are flat with little unevenness. On the other hand, the first to fourth side surfaces 13 to 16 are cut surfaces diced into individual pieces using a dicing blade. In the present disclosure, for example, the granularity of the dicing blade is controlled to promote shedding of particles of the metal magnetic powder 172 on the first to fourth side surfaces 13 to 16, and the recesses are actively provided on the first to fourth side surfaces 13 to 16 to increase the maximum depth of the recess on the side surface side rather than the principal surface side. Note that the recess of the present disclosure includes not only a recess formed by the shedding of particles of the metal magnetic powder 172 but also a recess formed by another method.

According to the inductor component 1, the recesses 11R and 14R are provided on the second side surface 14 as the at least one of the first to fourth side surfaces 13 to 16 of the element body 10 and the first principal surface 11 as the at least one of the first principal surface 11 and the second principal surface 12. Therefore, a surface area of the element body 10 increases, and the heat dissipation of the inductor component 1 can be improved.

In addition, in the thin component in which the area of each of the first principal surface 11 and the second principal surface 12 is larger than the area of each of the first to fourth side surfaces 13 to 16 and a so-called component thickness in the thickness direction is smaller than a component width in the length direction and the width direction, a ratio of the maximum depth of the recess on each of the first principal surface 11 and the second principal surface 12 relative to the component thickness in the thickness direction is higher than a ratio of the maximum depth of the recess of the first to fourth side surfaces 13 to 16 relative to the component width in the length direction and the width direction. Therefore, component mounting impact, flexural strength, or the like is affected more by the maximum depth of the recess on each of the first principal surface 11 and the second principal surface 12 than by the maximum depth of the recess on each of the first to fourth side surfaces 13 to 16. According to the inductor component 1, the maximum depth D1 of the recess 14R on the second side surface 14 is larger than the maximum depth D2 of the recess 11R on the first principal surface 11 in the thin component. That is, the maximum depth of the recess 14R of the second side surface 14 is set to be larger than the maximum depth of the recess 11R of the first principal surface 11 in the thin component. Therefore, it is possible to increase the surface area of the element body 10 on the side surface side while suppressing a decrease in the strength of the element body caused by the recess. As a result, the heat dissipation can be improved without reducing the strength of the element body 10.

In addition, in a case where image recognition of a component shape, a component direction, and the like is required using a mounter camera at the time of mounting the inductor component 1, a directivity recognition mark or the like is generally attached to the first principal surface 11 or the second principal surface 12. In a case where a recess having a large depth is provided on the first principal surface 11 or the second principal surface 12, it is difficult to distinguish a difference between the recess and the directivity recognition mark, and thus, there is a possibility that the visibility at the time of image recognition is reduced. According to the inductor component 1, the maximum depth D1 of the recess 14R on the second side surface 14 as the at least one of the first to fourth side surfaces 13 to 16 is larger than the maximum depth D2 of the recess 11R on the first principal surface 11 as the at least one of the first principal surface 11 and the second principal surface 12, and thus, it is easy to distinguish the difference between the recess and the direction recognition mark, and the heat dissipation can be improved without reducing the visibility at the time of image recognition.

Preferably, the second principal surface 12 is provided with one or a plurality of recesses, and the maximum depth of the deepest recess among the recesses on the second side surface 14 is larger than a maximum depth of a deepest recess among the recesses on the second principal surface 12.

According to the above configuration, the heat dissipation can be more effectively improved without decreasing the strength of the element body 10.

Preferably, the first side surface 13, the third side surface 15, and the fourth side surface 16 are each provided with one or a plurality of recesses, and each of maximum depths of deepest recesses among the recesses on the respective side surfaces of the first side surface 13, the third side surface 15, and the fourth side surface 16 is larger than the maximum depth of the deepest recess among the recesses on the first principal surface 11.

According to the above configuration, the heat dissipation of the side surface of the element body 10 can be further improved. In addition, the recesses are provided on all the side surfaces of the first to fourth side surfaces 13 to 16, and thus, the distribution of heat generation of the element body discharged from the side surface of the component can be controlled by controlling the maximum depth of the recess for each of the side surfaces of the element body. Thus, the heat dissipation of the inductor component 1 can be flexibly controlled in accordance with an arrangement of, for example, a cooling fan after mounting of the inductor component 1.

Preferably, the first side surface 13, the third side surface 15, and the fourth side surface 16 are each provided with one or a plurality of recesses, and each of maximum depths of deepest recesses among the recesses on the respective side surfaces of the first side surface 13, the third side surface 15, and the fourth side surface 16 is larger than the maximum depth of the deepest recess among the recesses on the first principal surface 11 and the maximum depth of the deepest recess among the recesses on the second principal surface 12.

According to the above configuration, the heat dissipation of the side surface of the element body 10 can be further effectively improved.

Preferably, the metal magnetic powder-containing resin 17 is exposed on at least one side surface among the first to fourth side surfaces 13 to 16, and all of the recesses on the at least one side surface among the first to fourth side surfaces 13 to 16 are provided on an exposed surface of the metal magnetic powder-containing resin 17.

The metal magnetic powder-containing resin 17 contains the metal magnetic powder 172, and thus, has a high thermal conductivity. According to the above embodiment, the heat dissipation of the inductor component 1 can be more effectively improved since all of the recesses on the at least one side surface among the first to fourth side surfaces 13 to 16 are provided on the exposed surface of the metal magnetic powder-containing resin 17.

Preferably, an inner surface of at least one recess on at least one side surface among the first to fourth side surfaces 13 to 16 is made of the resin 171 in the metal magnetic powder-containing resin 17.

The mechanical stress is more easily concentrated on the inner surface of the recess as compared with a portion other than the inner surface of the recess, and a defect such as a crack relatively easily occurs. According to the above configuration, the inner surface of the at least one recess on the at least one side surface among the first to fourth side surfaces 13 to 16 is made of the resin 171 in the metal magnetic powder-containing resin 17. Therefore, when the mechanical stress is concentrated on the inner surface of the recess, it is possible to suppress the occurrence of the defect such as the crack and to suppress deterioration in characteristics and reliability of the inductor component 1.

Preferably, the metal magnetic powder 172 contains iron, and a cut particle of the metal magnetic powder 172 is exposed on at least one side surface among the first to fourth side surfaces 13 to 16. Specifically, for example, the cut particle of the metal magnetic powder 172 is exposed to the second side surface 14 as indicated by a reference sign P in FIG. 5.

According to the above configuration, the heat dissipation of the side surface of the element body 10 can be improved since the cut particle of the metal magnetic powder 172 is exposed on the at least one side surface among the first to fourth side surfaces 13 to 16.

Preferably, when a maximum diameter of an exposed surface of the cut particle of the metal magnetic powder 172 is D (μm) and the distance between the first principal surface and the second principal surface is T (μm), $D \geq 0.3\ T$ is satisfied.

Here, the "maximum diameter of the exposed surface of the cut particle of the metal magnetic powder 172" means a maximum value among circle-equivalent diameters of exposed surfaces **172*f* of a plurality of cut particles of the metal magnetic powder 172 obtained from the particles of the metal magnetic powder 172 exposed to at least the one side surface among the first to fourth side surfaces 13 to 16**.

According to the above configuration, the heat dissipation of the side surface of the element body 10 can be improved since the maximum diameter of the exposed surface of the metal magnetic powder 172 can be set to be relatively large.

Preferably, $D \geq 10$ is satisfied.

According to the above configuration, the heat dissipation of the side surface of the element body 10 can be more effectively improved.

Preferably, an oxide film 173 is formed on the exposed surface **172*f* of the cut particle of the metal magnetic powder 172**.

The metal magnetic powder 172 has electrical conductivity, and current leakage may occur through the metal magnetic powder 172 when the cut particle of the metal magnetic powder 172 comes into contact with an external terminal of an adjacent component. According to the above configuration, the oxide film 173 is formed on the exposed surface **172*f* of the cut particle of the metal magnetic powder 172. Since the oxide film 173 increases an electrical resistance of the metal magnetic powder 172, a short-circuit resistance of the inductor component 1 can be improved. More preferably, the oxide film 173 is formed on the exposed surface even if the particle of the metal magnetic powder 172 exposed on the first to fourth side surfaces 13 to 16** is not cut.

(Manufacturing Method)

Next, a manufacturing method of the inductor component 1 will be described.

Figure 7A:
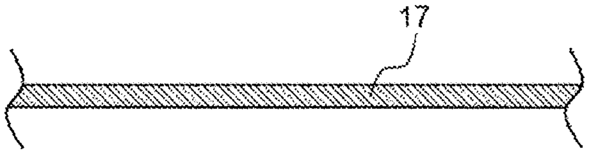
FIG. 7A is an explanatory view for describing a method of manufacturing the inductor component according to the first embodiment.
Figure 7B:
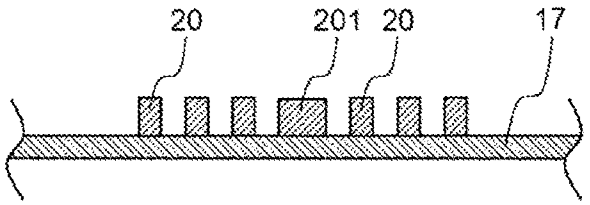
FIG. 7B is an explanatory view for describing the method of manufacturing the inductor component according to the first embodiment.
Figure 7C:
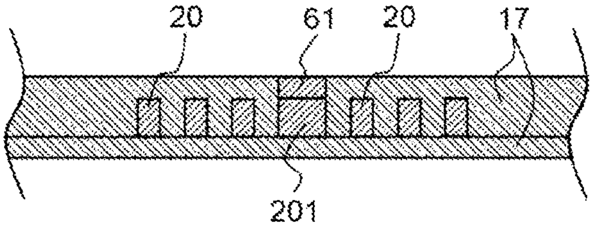
FIG. 7C is an explanatory view for describing the method of manufacturing the inductor component according to the first embodiment.
Figure 7D:
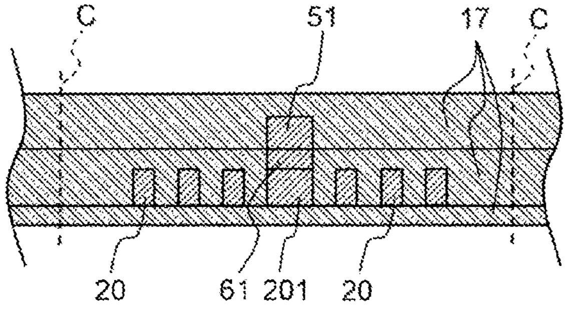
FIG. 7D is an explanatory view for describing the method of manufacturing the inductor component according to the first embodiment.
Figure 7E:
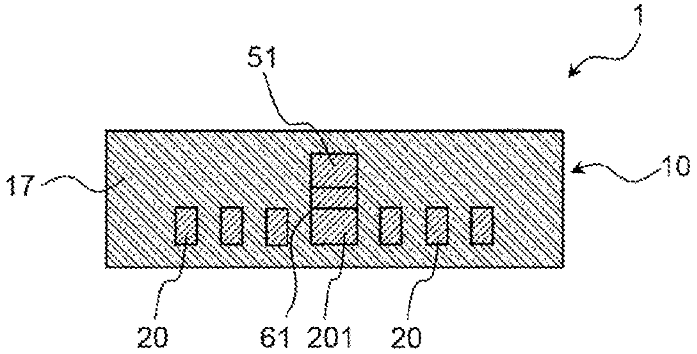
FIG. 7E is an explanatory view for describing the method of manufacturing the inductor component according to the first embodiment.

As illustrated in FIG. 7A, the metal magnetic powder-containing resin 17 as a base is prepared. At this time, a conductive seed layer (not illustrated) is formed on the metal magnetic powder-containing resin 17 by a sputtering method or the like. Subsequently, the coil 20 patterned by photolithography and the via pads 201 at both end portions of the coil 20 are provided on the metal magnetic powder-containing resin 17 as illustrated in FIG. 7B. The coil 20 and the via pad 201 are formed by disposing a photoresist patterned by, for example, photolithography on the metal magnetic powder-containing resin 17 including the seed layer, electrolytically plating copper on the seed layer supplied with power in an opening of the photoresist, and then, removing the photoresist to remove an unnecessary portion of the seed layer. Subsequently, the metal magnetic powder-containing resin 17 to be the second layer is provided on the metal magnetic powder-containing resin 17 as the base as illustrated in FIG. 7C. Thereafter, the metal magnetic powder-containing resin 17 as the second layer on the via pad 201 is opened by laser, blast, or the like, and the via wiring 61 is provided in the opening by electrolytic plating or the like. Subsequently, the first extended wiring 51 patterned by photolithography is provided such that an end portion thereof is connected to the via wiring 61 on the inner peripheral end side of the coil 20 as illustrated in FIG. 7D. At the same time, the second extended wiring 52 is provided on the via wiring 61 on the outer peripheral end side of the coil 20 although not illustrated. Thereafter, the metal magnetic powder-containing resin 17 to be the third layer is provided on the first extended wiring 51, the second extended wiring 52, and the metal magnetic powder-containing resin 17 to be the second layer. Thereafter, the metal magnetic powder-containing resin 17 as the third layer on end portions of the first extended wiring 51 and the second extended wiring 52 is opened by laser, blast, or the like, and extension portions of the first extended wiring 51 and the second extended wiring 52 extending in the Z direction are provided in the openings. Thereafter, a principal surface of the metal magnetic powder-containing resin 17 as the third layer is planarized by surface grinding or the like. Thereafter, the first external terminal 41 and the second external terminal 42 are provided by plating or the like on the first extended wiring 51 and the second extended wiring 52 exposed from the principal surface of the metal magnetic powder-containing resin 17 as the third layer. Thereafter, the inductor component 1 is diced into an individual piece along a cut line C, thereby manufacturing the inductor component 1 as illustrated in FIG. 7E.

The recesses of the first to fourth side surfaces 13 to 16 can be formed in the above-described dicing process. That is, the recesses can be provided on the first to fourth side surfaces 13 to 16 by promoting the shedding of particles of the metal magnetic powder in the dicing process. As a result of various studies conducted by the inventors, it has been found that the shedding of particles is promoted when cutting stress applied to one particle of metal magnetic powder is large. Specifically, it has been found that, for example, the shedding of particles of the metal magnetic powder can be promoted by adjusting specifications of a cutting blade and cutting conditions at the time of dicing with the dicing blade.

The inventors have observed a state of a cut surface by changing the cutting blade specifications. It has been found that it is possible to promote the shedding of particles can be promoted and form the recess on the side surface of the element body by increasing a cutting speed by the blade to increase a cutting resistance increases due to a blade traveling load and increase stress on the metal magnetic powder. In addition, it has been also found that it is possible to promote the shedding of particles and form the recess on the side surface of the element body by reducing a rotational speed of the cutting blade and suppressing self-sharpening of the blade to increase the cutting resistance and increase the stress on the metal magnetic powder. It has been also found that the shedding of particles of the metal magnetic powder can be promoted using the stress generated when abrasive grains exposed on a side surface come into contact with the metal magnetic powder on the side surface of the element body by using a dicing blade having a specification in which the abrasive grains are exposed on the side surface, which is found in an electroforming-type blade or the like, as another method.

Note that the above-described method for manufacturing the inductor component 1 is merely an example, and methods and materials used in each process may be appropriately replaced with other known methods and materials. For example, in the above description, the coil 20, the via pad 201, the via wiring 61, the first extended wiring 51, and the second extended wiring 52 may be formed using a base substrate such as ferrite or alumina and a dry film resist, or the like, instead of using the metal magnetic powder-containing resin 17 as the base, and then, the base substrate and the dry film resist may be removed, and the element body 10 may be formed by pressure-bonding the metal magnetic powder-containing resin 17 from the vertical direction. In addition, a sheet lamination method or a molding method may be adopted instead of the above-described build-up method.

Second Embodiment

Figure 8:
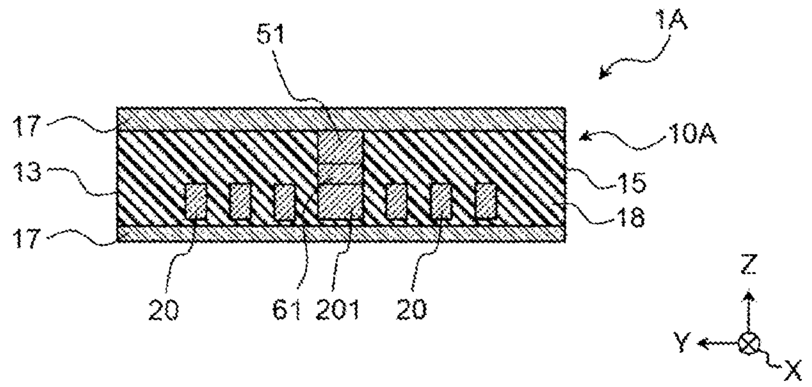
FIG. 8 is a sectional view illustrating an inductor component according to a second embodiment.

FIG. 8 is a sectional view illustrating a second embodiment of the inductor component. The second embodiment is different from the first embodiment in terms of a configuration of an element body. This different configuration will be described hereinafter. The other configurations are the same as those of the first embodiment, and thus, are denoted by the same reference signs as those of the first embodiment, and the description thereof will be omitted.

As illustrated in FIG. 8, the element body 10 includes an insulating resin 18 in addition to the metal magnetic powder-containing resin 17 in an inductor component 1A of the second embodiment as compared with the inductor component 1 of the first embodiment. The insulating resin 18 covers at least the entire surface of the coil 20. The insulating resin 18 is exposed to a part of the first to fourth side surfaces 13 to 16. Specifically, in the element body 10, the insulating resin 18 is provided in a region between a plane that is orthogonal to the Z direction and includes a lower surface of the coil 20 and a plane that is orthogonal to the Z direction includes an upper surface of a portion extending in the X direction of the first extended wiring 51. Thus, the insulating resin 18 exists in a region between the respective turns of the coil 20. Examples of the insulating resin 18 include an insulating material mainly containing epoxy, polyimide, or the like, a general printed board or BT resin substrate in which glass cloth is impregnated with an epoxy resin, an FR4 substrate (that is, a glass epoxy base material), and the like. Note that a recess may be provided in a region where the insulating resin 18 is exposed on the first to fourth side surfaces 13 to 16.

According to the present embodiment, an insulating property between wirings can be enhanced since the insulating resin 18 exists in the region between the turns of the coil 20.

Third Embodiment

Figure 9:
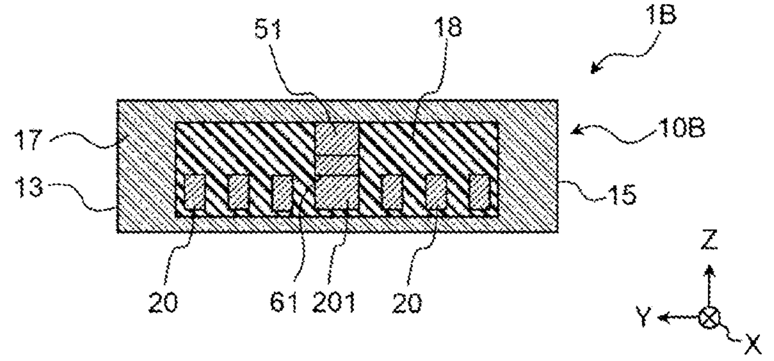
FIG. 9 is a sectional view illustrating an inductor component according to a third embodiment.

FIG. 9 is a sectional view illustrating a third embodiment of the inductor component. The third embodiment is different from the second embodiment in terms of a position where an insulating resin is provided. This different configuration will be described hereinafter. The other configurations are the same as those of the second embodiment, and thus, are denoted by the same reference signs as those of the second embodiment, and the description thereof will be omitted.

As illustrated in FIG. 9, the insulating resin 18 is not exposed to the first to fourth side surfaces 13 to 16 in an inductor component 1B of the third embodiment as compared with the inductor component 1A of the second embodiment. Specifically, the insulating resin 18 covers at least the entire surface of the coil 20 and is not exposed to the first to fourth side surfaces 13 to 16. Thus, the entire surfaces of the first to fourth side surfaces 13 to 16 are made of the metal magnetic powder-containing resin 17.

According to the present embodiment, heat dissipation of the inductor component can be improved more as compared with the second embodiment, and an insulating property between wirings can also be improved.

Fourth Embodiment

Figure 10:
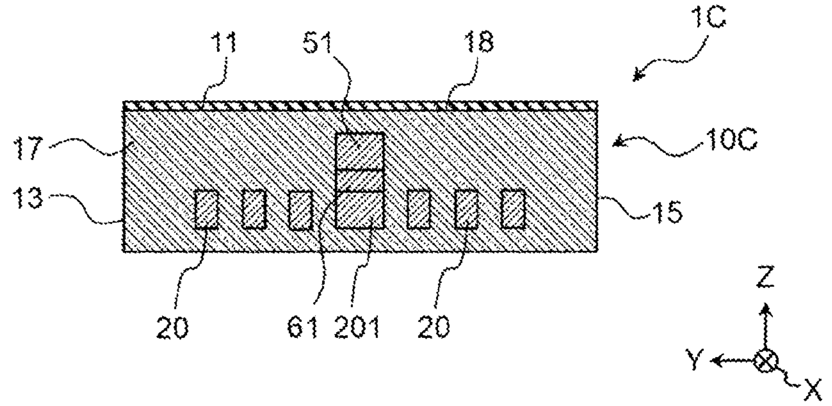
FIG. 10 is a sectional view illustrating an inductor component according to a fourth embodiment.

FIG. 10 is a sectional view illustrating a fourth embodiment of the inductor component. The fourth embodiment is different from the second embodiment in terms of a position where an insulating resin is provided. This different configuration will be described hereinafter. The other configurations are the same as those of the second embodiment, and thus, are denoted by the same reference signs as those of the second embodiment, and the description thereof will be omitted.

As illustrated in FIG. 10, the insulating resin 18 is provided on the first principal surface 11 in an inductor component 1C of the fourth embodiment as compared with the inductor component 1A of the second embodiment. Although the plurality of recesses 11R are formed on the first principal surface 11, the insulating resin 18 may planarize unevenness due to the plurality of recesses 11R or may have a shape reflecting the unevenness of the plurality of recesses 11R. In addition, the insulating resin 18 may be provided on the second principal surface 12, or may be provided on both the first principal surface 11 and the second principal surface 12.

According to the present embodiment, heat dissipation of the inductor component 1C can be improved, and an insulating property between external terminals can be improved.

Note that the present disclosure is not limited to the above-described embodiments, and can be modified in design within the scope not departing from the gist of the present disclosure. For example, characteristic points of the first to fourth embodiments may be variously combined.

Although the coil is a wiring extending in the spiral shape in the first embodiment, the shape of the coil is not particularly limited. For example, the coil may have a helical shape, a straight shape, a meander shape, or the like. In addition, internal wirings include the coil, the via pad, the via wiring, and the extended wiring in the first embodiment, but forms, arrangements, and the like of the internal wirings are not limited thereto. In addition, forms, positions, and the like of external terminals are not limited, either.

What is claimed is:

1. An inductor component comprising:
an element body; and
a coil in the element body,
the element body including a metal magnetic powder-containing resin having a resin and metal magnetic powder contained in the resin,
the element body having a rectangular parallelepiped shape that has a first principal surface and a second principal surface facing each other, and a first side surface, a second side surface, a third side surface, and a fourth side surface connected to the first principal surface and the second principal surface,
each of the first principal surface and the second principal surface having an area larger than an area of each of the first to fourth side surfaces,
each of the first side surface and the first principal surface having at least one recess,
a maximum depth of a deepest recess among the at least one recess on the first side surface being larger than a maximum depth of a deepest recess among the at least one recess on the first principal surface, and
a respective depth of each of the at least one recess on the first side surface is larger than a respective depth of each of the at least one recess on the first principal surface.

2. The inductor component according to claim 1, wherein
the first side surface faces the third side surface,
the second side surface faces the fourth side surface, and
a distance between the first principal surface and the second principal surface is shorter than a distance between the first side surface and the third side surface and a distance between the second side surface and the fourth side surface.

3. The inductor component according to claim 1, wherein
the second principal surface having at least one recess, and
the maximum depth of the deepest recess among the at least one recess on the first side surface is larger than a maximum depth of a deepest recess among the at least one recess on the second principal surface.

4. The inductor component according to claim 1, wherein
each of the second to fourth side surfaces has at least one recess, and
a maximum depth of a deepest recess among the at least one recess on each of the second to fourth side surfaces is larger than the maximum depth of the deepest recess among the at least one recess on the first principal surface.

5. The inductor component according to claim 1, wherein
the distance between the first principal surface and the second principal surface is 300 μm or less.

6. The inductor component according to claim 1, wherein
the metal magnetic powder-containing resin is exposed on the first side surface, and
all of the at least one recess on the first side surface are on an exposed surface of the metal magnetic powder-containing resin.

7. The inductor component according to claim 1, wherein
an inner surface of the at least one recess on the first side surface has a hemispherical shape.

8. The inductor component according to claim 1, wherein
the resin in the metal magnetic powder-containing resin defines an inner surface of the at least one recess on the first side surface.

9. The inductor component according to claim 1, wherein
the metal magnetic powder contains iron, and
a cut particle of the metal magnetic powder is exposed on at least one of the first to fourth side surfaces.

10. The inductor component according to claim 9, wherein
when a maximum diameter of an exposed surface of the cut particle of the metal magnetic powder is D (μm) and the distance between the first principal surface and the second principal surface is T (μm), $D \geq 0.3\,T$ is satisfied.

11. The inductor component according to claim 10, wherein
$D \geq 10$ μm is further satisfied.

12. The inductor component according to claim 9, wherein
an oxide film is on the exposed surface of the cut particle of the metal magnetic powder.

13. The inductor component according to claim 2, wherein the second principal surface having at least one recess, and the maximum depth of the deepest recess among the at least one recess on the first side surface is larger than a maximum depth of a deepest recess among the at least one recess on the second principal surface.

14. The inductor component according to claim 2, wherein each of the second to fourth side surfaces has at least one recess, and a maximum depth of a deepest recess among the at least one recess on each of the second to fourth side surfaces is larger than the maximum depth of the deepest recess among the at least one recess on the first principal surface.

15. The inductor component according to claim 2, wherein the distance between the first principal surface and the second principal surface is 300 μm or less.

16. The inductor component according to claim 2, wherein the metal magnetic powder-containing resin is exposed on the first side surface, and all of the at least one recess on the first side surface are on an exposed surface of the metal magnetic powder-containing resin.

17. The inductor component according to claim 2, wherein an inner surface of the at least one recess on the first side surface has a hemispherical shape.

18. The inductor component according to claim 2, wherein the resin in the metal magnetic powder-containing resin defines an inner surface of the at least one recess on the first side surface.

19. The inductor component according to claim 2, wherein the metal magnetic powder contains iron, and a cut particle of the metal magnetic powder is exposed on at least one of the first to fourth side surfaces.

20. The inductor component according to claim 10, wherein an oxide film is on the exposed surface of the cut particle of the metal magnetic powder.

* * * * *